United States Patent
Li et al.

(10) Patent No.: US 9,947,437 B2
(45) Date of Patent: Apr. 17, 2018

(54) METAL SHEATHED CABLE DESIGNED ON THE BASIS OF TORQUE BALANCE AND DESIGN METHOD THEREOF

(71) Applicant: ZHONGTIAN TECHNOLOGY SUBMARINE CABLE CO., LTD., Nantong, Jiangsu (CN)

(72) Inventors: Xuesong Li, Jiangsu (CN); Bingyu Cai, Jiangsu (CN); Jianmin Zhang, Jiangsu (CN); Zhijin Ma, Jiangsu (CN); Ming Hu, Jiangsu (CN)

(73) Assignee: ZHONGTAN TECHNOLOGY SUBMARINE CABLE CO., LTD., Nantong, Jiangsu (CN)

( * ) Notice: Subject to any disclaimer, the term of this patent is extended or adjusted under 35 U.S.C. 154(b) by 0 days.

(21) Appl. No.: 15/306,769

(22) PCT Filed: Jul. 8, 2015

(86) PCT No.: PCT/CN2015/083576
§ 371 (c)(1),
(2) Date: Oct. 26, 2016

(87) PCT Pub. No.: WO2016/008378
PCT Pub. Date: Jan. 21, 2016

(65) Prior Publication Data
US 2017/0047146 A1 Feb. 16, 2017

(30) Foreign Application Priority Data
Jul. 18, 2014 (CN) .......................... 2014 1 0347594

(51) Int. Cl.
*H01B 7/14* (2006.01)
*H01B 7/04* (2006.01)
(Continued)

(52) U.S. Cl.
CPC ............... *H01B 7/14* (2013.01); *H01B 7/045* (2013.01); *H01B 7/2825* (2013.01);
(Continued)

(58) Field of Classification Search
None
See application file for complete search history.

(56) References Cited

U.S. PATENT DOCUMENTS

| | | | | |
|---|---|---|---|---|
| 1,753,079 A | * | 4/1930 | Zapf | H01B 7/14 174/108 |
| 1,798,298 A | * | 3/1931 | Zapf | H01B 7/14 174/103 |

(Continued)

FOREIGN PATENT DOCUMENTS

| | | |
|---|---|---|
| CN | 2605645 | 3/2004 |
| CN | 104112509 | 10/2014 |

(Continued)

OTHER PUBLICATIONS

International Search Report of PCT/CN2015/083576 dated Oct. 9, 2015, 4 pages (English and Chinese).
(Continued)

*Primary Examiner* — Chau N Nguyen
*Assistant Examiner* — Muhammed Azam
(74) *Attorney, Agent, or Firm* — Rankin, Hill & Clark LLP

(57) ABSTRACT

A metal sheathed cable includes an optical unit and a control unit helically twisted together, a grounding wire unit distributed in the gaps between the optical unit and the control unit to form an inner layer cable core, a filler watertightly filled into gaps among the optical unit, the control unit and the grounding wire unit, and a taped covering arranged outside the inner layer cable core; a power unit and a filling core helically twisted around the inner layer cable core, the
(Continued)

grounding wire unit distributed in the gap between the power unit and the filling core, the filler watertightly filled into gaps among the power unit, the grounding wire unit and the filling core, and the taped covering arranged outside the outer layer cable core; an inner protective layer wrapped outside the outer layer core, and a sheathing layer twisted outside the inner protective layer.

1 Claim, 1 Drawing Sheet

(51) Int. Cl.
    *H01B 7/282*     (2006.01)
    *G02B 6/44*     (2006.01)
(52) U.S. Cl.
    CPC .......... *G02B 6/4416* (2013.01); *G02B 6/4417* (2013.01); *G02B 6/4427* (2013.01)

(56) References Cited

U.S. PATENT DOCUMENTS

| | | | | |
|---|---|---|---|---|
| 4,156,104 A * | 5/1979 | Mondello | G02B 6/4427 | 174/106 R |
| 4,767,182 A * | 8/1988 | Parfree | G02B 6/4427 | 385/107 |
| 4,979,795 A | 12/1990 | Mascarenhas | | |
| 5,105,612 A * | 4/1992 | Brown | D07B 1/0693 | 57/213 |
| 5,787,217 A * | 7/1998 | Traut | G02B 6/4411 | 385/100 |
| 5,892,874 A * | 4/1999 | Houghton | G02B 6/4416 | 385/101 |
| 6,178,278 B1 * | 1/2001 | Keller | G02B 6/4436 | 385/109 |
| 6,253,012 B1 * | 6/2001 | Keller | G02B 6/4436 | 385/103 |
| 6,714,709 B1 * | 3/2004 | Birkeland | G02B 6/4427 | 385/111 |
| 7,295,735 B2 * | 11/2007 | Kim | G02B 6/441 | 385/100 |
| 8,402,732 B1 * | 3/2013 | Wen | D07B 1/0693 | 57/213 |
| 8,831,389 B2 * | 9/2014 | McCullough | H01B 7/14 | 385/101 |
| 8,909,015 B2 * | 12/2014 | Lim | G02B 6/443 | 385/109 |
| 2002/0136513 A1 * | 9/2002 | Consonni | G02B 6/4427 | 385/113 |
| 2004/0197059 A1 * | 10/2004 | Castellani | C08L 23/10 | 385/113 |
| 2007/0240893 A1 * | 10/2007 | Bremnes | F16L 53/007 | 174/36 |
| 2010/0277329 A1 * | 11/2010 | Worzyk | G01M 11/086 | 340/679 |
| 2011/0005795 A1 * | 1/2011 | Deighton | H01B 7/045 | 174/47 |
| 2012/0024565 A1 * | 2/2012 | Orini | H01B 7/14 | 174/106 R |
| 2012/0308185 A1 * | 12/2012 | Anelli | C23F 13/04 | 385/109 |
| 2013/0048373 A1 * | 2/2013 | Fogg | H01B 7/045 | 174/70 R |
| 2013/0051740 A1 * | 2/2013 | Fogg | H01B 7/045 | 385/101 |
| 2014/0166335 A1 * | 6/2014 | Kagoura | H01B 7/045 | 174/107 |
| 2016/0155537 A1 * | 6/2016 | Manabe | H01B 7/045 | 174/107 |
| 2017/0047146 A1 * | 2/2017 | Li | H01B 7/14 | |

FOREIGN PATENT DOCUMENTS

| | | | | |
|---|---|---|---|---|
| CN | 104112509 A | * | 10/2014 | ............. H01B 7/14 |
| CN | 204045243 | | 12/2014 | |

OTHER PUBLICATIONS

Xie, Shuhong et al., "Outline of the Metallically Armored Cable for Subsea Detectors" Optical Fiber & Electric Cable and Their Applications, No. 5, Oct. 31, 2013 (Abstract).

* cited by examiner

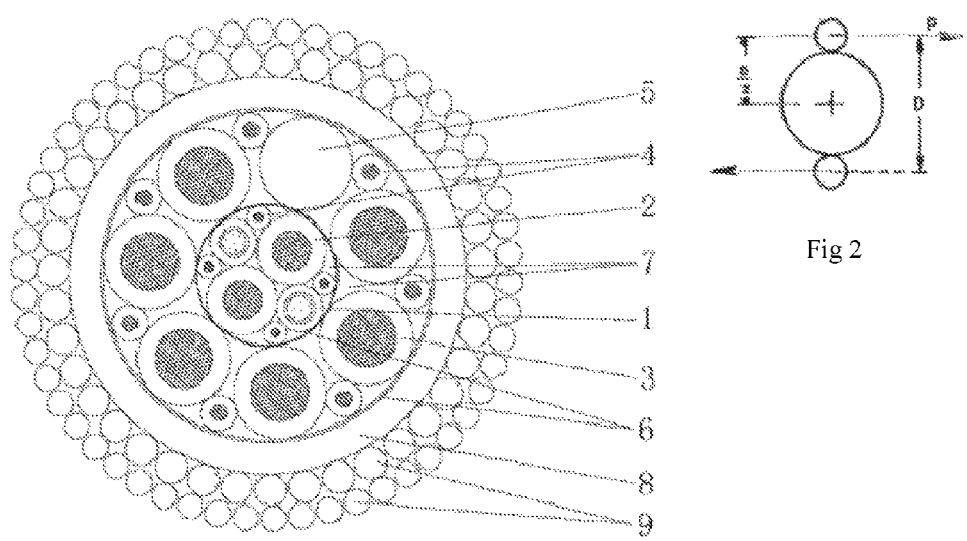
Fig 1
Fig 2
Fig 3
Fig 4

METAL SHEATHED CABLE DESIGNED ON THE BASIS OF TORQUE BALANCE AND DESIGN METHOD THEREOF

TECHNICAL FIELD

The invention relates to a metal sheathed cable and a design method thereof, in particular to a metal sheathed designed on the basis of torque balance and a design method thereof

BACKGROUND

As an important connection carrier for deep-sea ROVs, underwater towed systems and mother ships, the metal sheathed cable is a key component of submarine detection systems (such as deep-sea ROVs and towed vehicles) with such comprehensive functions as power transmission, fiber-optic communication, copper cable communication, remote control commands propagation, video image transmission and ROVs/towed vehicles retracting-releasing and carrying, and is characterized by higher tensile/weight ratios, flexible bending property, excellent corrosion resistance, wear resistance and repeatedly retracting-releasing capabilities. The steel wire sheathing layer of the metal sheathed cable is generally twisted counterclockwise by two or three layers of ultra-high tensile steel wires so as to be equipped with the mechanical strength as the operational requirements required. In general, the metal sheathed cable is easy to rotate, i.e., twist, when bearing a working load, and even to break in severe cases, which may lead to the loss of deep-sea ROV, towed vehicles and other submarine detection systems, resulting in serious economic losses. In order to avoid the twisting phenomenon of the metal sheathed cable when it is bearing a working load, the steel wire sheathing layer may adopt a torque balance design so as to eliminate the torque deviation existing between layers inside a steel wire sheathing layer of a metal sheathed cable at the structural design level, thereby guaranteeing that the metal sheathed cable does not rotate when bearing a working load.

BRIEF DESCRIPTION

Purpose of the Invention

In order to solve the problem existing in the prior art, the present invention provides a metal sheathed cable designed on the basis of torque balance, which can effectively solve the problem of the torque deviation existing between layers inside a steel wire sheathing layer of a metal sheathed cable at the structural design level, thereby guaranteeing that the metal sheathed cable does not rotate when bearing a working load.

Technical Scheme

A metal sheathed cable designed on the basis of torque balance and a design method thereof, comprising an optical unit, a control unit, a power unit, a grounding wire unit, a filling core, a taped covering, a watertight filler, an inner protective layer and a sheathing layer. The optical unit and the control unit are helically twisted together, the grounding wire unit is distributed in gaps between the optical unit and the control unit to form an inner layer cable core, a filler is watertightly filled into the gap among the optical unit, the control unit and the grounding wire unit of the inner layer cable core, and a taped covering is arranged outside the inner layer cable core; the power unit and the filling core are helically twisted around the inner layer cable core, the grounding wire unit is distributed in the gap between the power unit and the filling core to form an outer layer cable core, the filler is watertightly filled into the gaps among the power unit, the grounding wire unit and the filling core of the outer layer cable core, and a taped covering is arranged outside the outer layer cable core; an inner protective layer is wrapped outside the outer layer core, and the sheathing layer is twisted outside the inner protective layer, the sheathing layer adopts the design method of torque balance.

The design method of torque balance for the metal sheathed cable is as follows:

$$T = \frac{P*D}{2}$$

$$\sin\theta = \frac{P}{W}$$

$$E = \frac{\frac{W}{A}}{\varepsilon}$$

$$P = E*A*\varepsilon*\sin\theta$$

$$T = \frac{E*A*\varepsilon*D*\sin\theta}{2}$$

$$\sum T = \frac{N*E*A*\varepsilon*D*\sin\theta}{2}$$

$$R_T = \frac{\sum T_0}{\sum T_i} = \frac{N_o*E_0*A_0*\varepsilon_0*D_0*\sin\theta_0}{N_i*E_i*A_i*\varepsilon_i*D_i*\sin\theta_i}$$

E of the inner steel wire is the same as $\varepsilon$ of the outer steel wire, then $$R_T = \frac{N_o*A_0*D_o*\sin\theta_0}{N_i*A_i*D_i*\sin\theta_i}$$

$$A = \frac{\pi}{4}d^2$$

$$R_T = \frac{N_o*d_o^2*D_o*\sin\theta_0}{N_i*d_i^2*D_i*\sin\theta_i}$$

in which, A—area of the single steel wire;
d—diameter of the steel wire;
D—pitch diameter of the sheathing layer;
E—elastic modulus of the steel wire;
N—numbers of the single steel wire;
P—circumferential force of the steel wire;
RT—torque coefficient;
T—torque;
W—tensile strength of the steel wire;
θ—stranding angle of the steel wire;
ε—strain of the steel wire;
o—outer steel;
i—inner steel.

The beneficial effect of the invention is:
In general, the metal sheathed cable is easy to rotate when bearing a working load, ie., twist, and to break in severe cases, which leads to the loss of deep-sea ROVs, towed vehicles and other submarine detection systems, resulting in serious economic losses. The invention can effectively solve the twisting problem of the metal sheathed cable when it is bearing a working load so as to eliminate the torque deviation existing between layers inside a steel wire sheathing layer of a metal sheathed cable at the structural design level, thereby guaranteeing that the metal sheathed cable does not rotate when bearing a working load.

BRIEF DESCRIPTION OF THE DRAWINGS

FIG. 1 is a structure diagram of the invention;
In the FIG. 1—optical unit, 2—control unit, 3—power unit, 4—grounding wire unit, 5—filling core, 6—taped covering, 7—watertight filler, 8—inner protective layer, 9—sheathing layer;
FIG. 2 is a schematic view of the steel wire torque of the invention;
FIG. 3 is a schematic view of the steel wire circumferential force of the invention;
FIG. 4 is a schematic view of the steel wire stranding angle of the invention.

DETAILED DESCRIPTION

The invention will be further described in combination with embodiments.

Embodiments

As shown in FIG. 1, a metal sheathed cable designed on the basis of torque balance, comprising an optical unit 1, a control unit 2, a power unit 3, a grounding wire unit 4, a filling core 5, a taped covering 6, a watertight filler 7, an inner protective layer 8 and a sheathing layer 9.

The optical unit 1 and the control unit 2 are helically twisted together, a grounding wire unit 4 is distributed in gaps between the optical unit 1 and the control unit 2 to form an inner layer cable core, a filler 7 is watertightly filled into the gap among the optical unit 1, the control unit 2 and the grounding wire unit 4 of the inner layer cable core, and a taped covering 6 is arranged outside the inner layer cable core; the power unit 3 and the filling core 5 are helically twisted around the inner layer cable core, the grounding wire unit 4 is distributed in the gap between the power unit 3 and the filling core 5 to form an outer layer cable core, the filler 4 is watertightly filled into the gaps among the power unit 3, the grounding wire unit 4 and the filling core 5 of the outer layer cable core, and a taped covering 6 is arranged outside the outer layer cable core; an inner protective layer 8 is wrapped outside the outer layer core, and the sheathing layers 9 is twisted outside the inner protective layer 8.

The sheathing layer 9 is twisted counterclockwise by two-layer ultra-high tensile galvanized steel wires, wherein the design method of the torque balance design method is:
According to FIG. 2:

$$T = \frac{P * D}{2}$$

According to FIG. 3 and FIG. 4:

$$\sin\theta = \frac{P}{W}$$

$$E = \frac{\frac{W}{A}}{\varepsilon}$$

$$P = E * A * \varepsilon * \sin\theta$$

$$T = \frac{E * A * \varepsilon * D * \sin\theta}{2}$$

$$\sum T = \frac{N * E * A * \varepsilon * D * \sin\theta}{2}$$

$$R_T = \frac{\sum T_o}{\sum T_i} = \frac{N_o * E_0 * A_0 * \varepsilon_0 * D_0 * \sin\theta_0}{N_i * E_i * A_i * \varepsilon_i * D_i * \sin\theta_i}$$

E of the inner steel wire is the same as ε of the outer steel wire, then $$R_T = \frac{N_o * A_0 * D_o * \sin\theta_0}{N_i * A_i * D_i * \sin\theta_i}$$

$$A = \frac{\pi}{4} d^2$$

$$R_T = \frac{N_o * d_o^2 * D_o * \sin\theta_0}{N_i * d_i^2 * D_i * \sin\theta_i}$$

in which, A—area of the single steel wire;
d—diameter of the steel wire;
D—pitch diameter of the sheathing layer;
E—elastic modulus of the steel wire;
N—numbers of the single steel wire;
P—circumferential force of the steel wire;
RT—torque coefficient;
T—torque;
W—tensile strength of the steel wire;
θ—stranding angle of the steel wire;
ε—strain of the steel wire;
o—outer steel;
i—inner steel.

By adopting the above design method of torque balance, the problem of the torque deviation existing between layers inside a steel wire sheathing layer of a metal sheathed cable at the structural design level can be solved, thereby guaranteeing that the metal sheathed cable does not rotate when bearing a working load.

The invention claimed is:
1. A metal sheathed cable designed on the basis of torque balance, comprising: an optical unit, a control unit, a power unit, a grounding wire unit, a filling core, a taped covering layer, a watertight filler, an inner protective layer and a sheathing layer, wherein the optical unit and the control unit are helically twisted together, the grounding wire unit are distributed in gaps between the optical unit and the control unit to form an inner layer cable core, the filler is watertightly filled into the gap among the optical unit, the control unit and the grounding wire unit of the inner layer cable core, and a taped covering is arranged outside the inner layer cable core; the power unit and the filling core are helically twisted around the inner layer cable core, the grounding wire unit are distributed in the gap between the power unit and the filling core to form an outer layer cable core,
the filler is watertightly filled into the gaps among the power unit, the grounding wire unit and the filling core of the outer layer cable core, and a taped covering is arranged outside the outer layer cable core; an inner protective layer is wrapped outside the outer layer core, and a sheathing layers is twisted outside the inner protective layer, the sheathing layer (9) adopts the design method of torque balance, and
wherein the design method of torque balance for the metal sheathed cable is as follows:

$$T = \frac{P*D}{2}$$

$$\sin\theta = \frac{P}{W}$$

$$E = \frac{\frac{W}{A}}{\varepsilon}$$

$$P = E*A*\varepsilon*\sin\theta$$

$$T = \frac{E*A*\varepsilon*D*\sin\theta}{2}$$

$$\sum T = \frac{N*E*A*\varepsilon*D*\sin\theta}{2}$$

$$R_T = \frac{\sum T_o}{\sum T_i} = \frac{N_o*E_0*A_0*\varepsilon_0*D_0*\sin\theta_0}{N_i*E_i*A_i*\varepsilon_i*D_i*\sin\theta_i}$$

E of the inner steel wire is the same as ε of the outer steel wire, then $$R_T = \frac{N_o*A_0*D_o*\sin\theta_0}{N_i*A_i*D_i*\sin\theta_i}$$

$$A = \frac{\pi}{4}d^2$$

$$R_T = \frac{N_o*d_o^2*D_o*\sin\theta_0}{N_i*d_i^2*D_i*\sin\theta_i}$$

in which, A—area of the single steel wire;
d—diameter of the steel wire;
D—pitch diameter of the sheathing layer;
E—elastic modulus of the steel wire;
N—numbers of the single steel wire;
P—circumferential force of the steel wire;
RT—torque coefficient;
T—torque;
W—tensile strength of the steel wire;
θ—stranding angle of the steel wire;
ε—strain of the steel wire;
o—outer steel;
i—inner steel.

* * * * *